Feb. 13, 1945.  R. JONGEDYK  2,369,298
MACHINE CONTROL MECHANISM
Filed Sept. 3, 1941  2 Sheets-Sheet 1
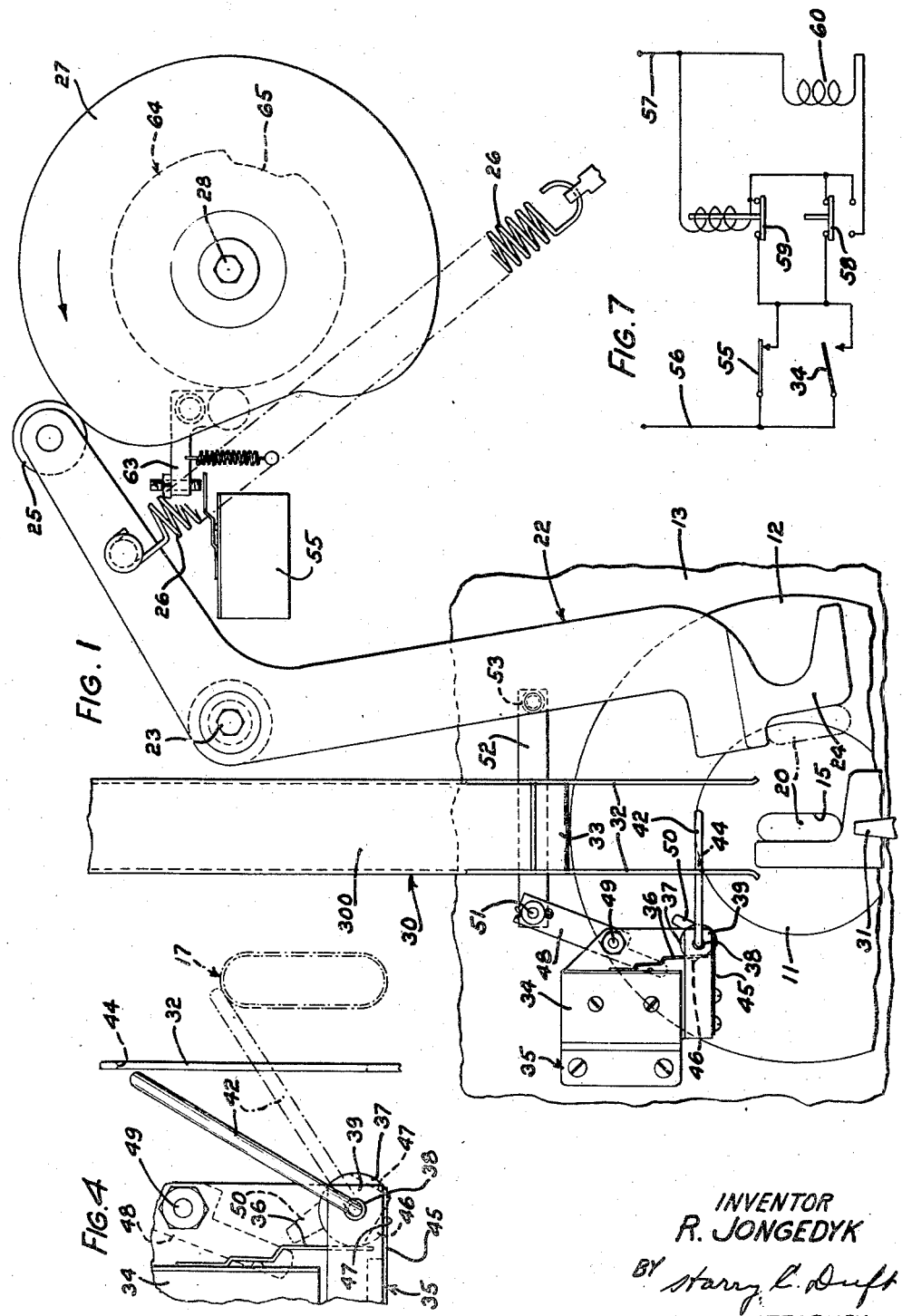
INVENTOR
R. JONGEDYK
BY Harry R. Duft
ATTORNEY Feb. 13, 1945.　　　　R. JONGEDYK　　　　2,369,298
MACHINE CONTROL MECHANISM
Filed Sept. 3, 1941　　　　2 Sheets-Sheet 2
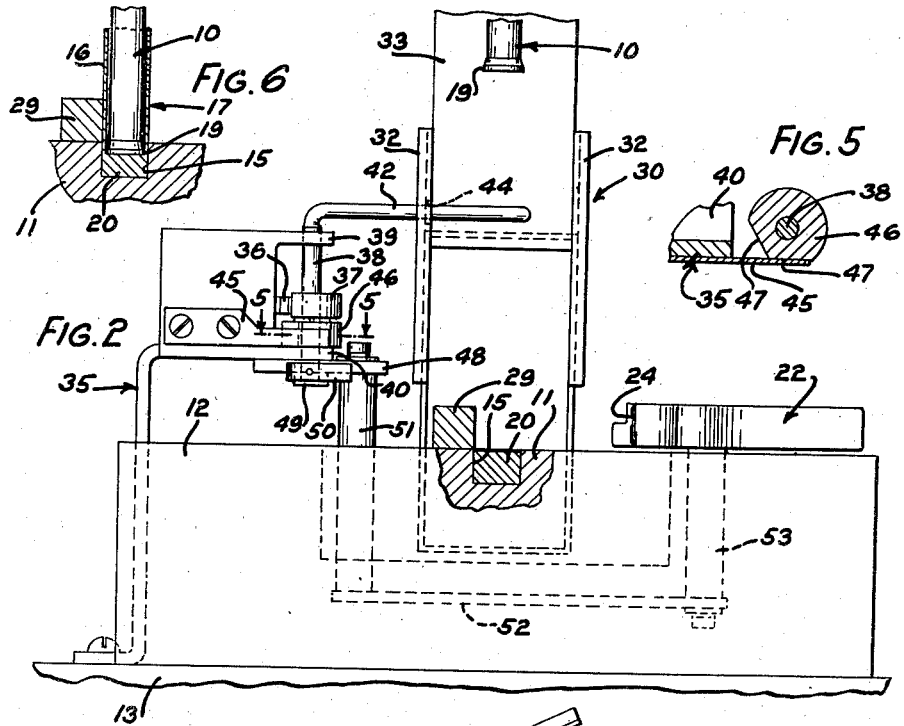
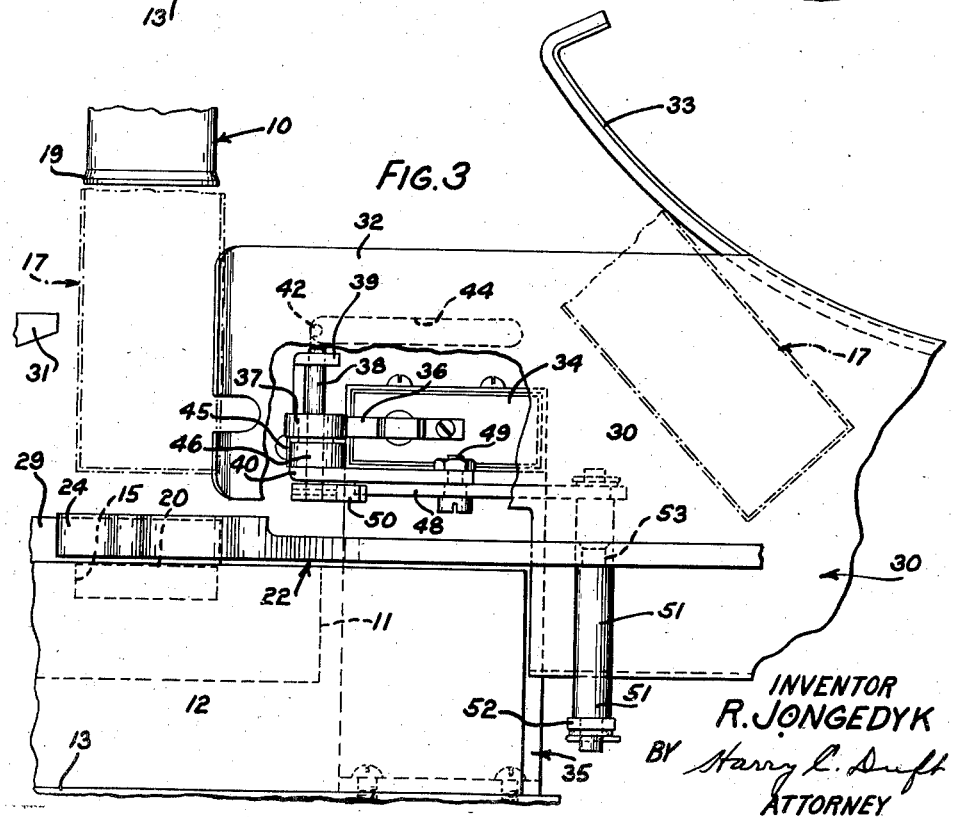
INVENTOR
R. JONGEDYK
BY Harry L. Duft
ATTORNEY Patented Feb. 13, 1945

2,369,298

UNITED STATES PATENT OFFICE 2,369,298

MACHINE CONTROL MECHANISM

Ralph Jongedyk, Hinsdale, Ill., assignor to Western Electric Company, Incorporated, New York, N. Y., a corporation of New York Application September 3, 1941, Serial No. 409,371

4 Claims. (Cl. 207—2)

This invention relates to machine control mechanisms, and more particularly to an automatic stop mechanism for presses and the like.

An object of the invention is to provide a simple, inexpensive and reliable control mechanism for power operated machines.

One embodiment of the invention contemplates the provision of a control mechanism for extruding presses, whereby the press may be stopped automatically to prevent damage to the punch and die and delays due to "pile-up" of defective articles on the punch and in the die when the machine fails to properly discharge a previously extruded article. In a preferred form of extruding press control mechanism embodying the invention, the actuation of the usual one-revolution clutch to initiate each extruding cycle of the press requires the closing of a normally open electrical switch which is adapted to be closed momentarily by previously extruded articles only when they are properly discharged from the press.

Other features and advantages of the invention will become apparent from the following detailed description when read in conjunction with the accompanying drawings, in which Fig. 1 is a fragmentary plan view of an extruding press equipped with an automatic stop mechanism embodying the invention;

Fig. 2 is a fragmentary front elevational view thereof;

Fig. 3 is a fragmentary side elevational view thereof;

Fig. 4 is an enlarged fragmentary plan view of a portion of the stop mechanism with the parts shown in different positions than in Fig. 1;

Fig. 5 is an enlarged fragmentary section on line 5—5 of Fig. 2;

Fig. 6 is a fragmentary vertical sectional view of the extruding punch and die, illustrating the extruding operation; and Fig. 7 is a wiring diagram of the electrical operating circuit for the automatic stop mechanism.

The invention is illustrated in the drawings as embodied in an extruding press for making seamless containers by a so-called backward extrusion process, in which a portion of a metal slug or blank is squeezed or extruded through a space between a vertically reciprocable punch and a cooperating die cavity and is caused to flow upwardly along the shank of the punch to form the wall of the container, while the portion of the metal blank remaining between the bottom of the punch and the bottom of the die forms the bottom of the extruded container.

The extruding press illustrated in the drawings comprises a vertically reciprocable punch or plunger 10 (Figs. 2 and 3) and a cooperating die 11, the latter being mounted in a die holder 12 attached to a stationary die supporting platen 13, only a portion of which is shown in the drawings. The extruding punch is attached in the usual manner to a punch holder (not shown) which, in turn, is attached to the reciprocatory platen or ram of the press.

The die has a die cavity 15 adapted to receive the slightly enlarged end portion 19 of the punch, which is of somewhat smaller cross section than the die cavity. The construction is such that when a metal blank 20 (Fig. 2) placed in the die cavity is compressed by the punch, a portion of the blank is extruded or squeezed upwardly through the space between the punch and the wall of the die cavity. The extruded portion of the metal blank flows upwardly along the shank of the punch to form the wall 16 of an extruded container 17, as shown in Fig. 6, while the portion of the blank remaining between the end of the punch and the bottom of the die cavity forms the bottom of the container.

The metal blanks may be inserted into the die cavity by hand, but in the illustrated embodiment of the invention, mechanical feeding means in the form of an oscillatory arm 22 is provided for feeding the blanks, one at a time, into the die cavity. This blank feeding arm is pivotally mounted intermediate its ends on a fixed vertical shaft 23 (Fig. 1) and is formed at one end with a blank engaging portion 24, which is horizontally movable above the upper surface of the die and die holder. At its opposite end, the blank feeding arm carries a cam roller 25, which is held by a spring 26 against a cam 27. The cam is fixed to a cam shaft 28 and is designed to impart one complete oscillatory movement to the blank feeding arm for each revolution of the cam shaft. The cam shaft is driven by suitable means (none shown) in synchronism with the reciprocatory ram of the press and makes one revolution for each reciprocation of the ram.

The cam 27 is designed to actuate the blank feeding arm to feed the blanks into the die cavity while the extruding punch is elevated or retracted from the die cavity. An upstanding wall or barrier 29 may be provided adjacent the die cavity for guiding the blanks into the die cavity. Suitable means (none shown) may be provided for supplying the blanks to the blank feeding arm, or they may be manually placed, one at a time, in front of the blank engaging portion 24 of the arm in the position indicated in broken lines in Fig. 1.

In extruding presses of the type above referred to, mechanism is usually provided for stripping the extruded articles from the punch as the latter is elevated or retracted from the die cavity. A preferred form of the stripper mechanism is disclosed in my co-pending application, Serial No. 383,151, filed March 13, 1941. However, other forms of mechanical or pneumatic stripper mechanisms may be employed with satisfactory results.

After being stripped from the extruding punch, the extruded containers are discharged from the press so as to free the punch and die for the next extruding cycle. In the illustrated embodiment of the invention, the extruded containers, after being stripped from the punch, are propelled into a receiving chute 30 by compressed air from a nozzle 31, only a portion of which is shown. The receiving chute may be of any suitable construction capable of directing the containers into a suitable collecting receptacle (not shown). The chute illustrated in the drawings comprises a horizontal tubular portion 300 (Fig. 1) of rectangular cross section and its side walls have reduced extensions 32—32 which project forwardly above the die and die holder to points adjacent to and on opposite sides of the die cavity. The top wall of the chute has an upwardly curved portion 33 at its forward end, which serves to tilt the extruded containers from a vertical position to a horizontal position as they are blown into the mouth of the chute, as illustrated in broken lines in Fig. 3.

In accordance with an important feature of the present invention, mechanism is provided for automatically stopping or interrupting the operation of the press whenever a previously extruded container is not properly discharged into the receiving chute 30. This mechanism comprises a normally open electrical control switch 34 (Figs. 1, 3 and 4) which is mounted on a bracket 35 attached to the stationary platen 13 of the press. The switch has a leaf spring type of operating arm 36, which is adapted to be actuated by a cam 37 keyed to a vertical shaft 38, which is rotatably journalled in spaced bearing portions 39 and 40 of the bracket 35. Extending transversely from the upper end of shaft 38 is an arm 42, which protrudes into the mouth of the chute 30 through an elongated slot 44 in one of the side wall extensions 32 of the chute. The arrangement is such that the free end of arm 42 normally lies in the path of extruded containers which are propelled into the chute by the blast of air from the nozzle 31. Thus, each extruded container that is discharged into the chute strikes the free end of arm 42 and pushes it rearwardly from the position shown in Fig. 1, whereby the shaft 38 and cam 37 are turned counter-clockwise, as shown in Fig. 4, to a position wherein the cam closes the normally open control switch 34. A leaf spring 45 is attached at one end to bracket 35 and its free end cooperates with a holding cam 46 on shaft 38 to yieldably hold the shaft either in the normal position or in the switch closing position. As best shown in Fig. 5, the holding cam 46 has two flat surfaces 47—47 for engagement by leaf spring 45 to hold shaft 38 and switch closing cam 37 either in the normal position shown in Fig. 1 or in the switch closing position shown in Fig. 4.

Restoration of the shaft, together with switch operating cam 37 and arm 42, to their normal positions is accomplished by means of a lever 48, which is pivoted intermediate its ends on a vertical stud 49 attached to the switch supporting bracket. One end of the lever is adapted to cooperate with a cam finger 50 attached to the lower end of shaft 38. The opposite end of the lever is pivotally connected to the upper end of a vertical post 51, which is attached at its lower end to one end of a horizontal link 52 (Figs. 2 and 3). At its opposite end, the link 52 is pivotally connected to the lower end of a vertical post 53 attached to and depending from the blank feeding arm 22. The construction and arrangement just described is such that during each blank feeding movement of the blank feeding arm, the lever 48 is turned counter-clockwise (Figs. 1 and 4), so that the free end thereof engages and cooperates with the cam finger 50 to restore shaft 38, cam 37 and arm 42 to their normal positions.

As shown schematically in Fig. 7, the normally open switch 34 is included in an electrical control circuit which also includes a normally closed switch 55 arranged in parallel with switch 34. The control circuit is connected by line wires 56 and 57 to a suitable source of electrical current (not shown). Also included in the control circuit is a manually operated "two-position" push button switch 58, a magnetic switch 59 and an energizing winding 60 of an electrical solenoid for operating the usual one-revolution clutch (not shown) of the press.

The several control switches and the energizing winding 60 of the clutch operating solenoid are connected in the control circuit as shown in Fig. 7, wherein the several switches are illustrated in their normal positions, that is, in the positions they assume when the press is at rest with the extruding punch in its elevated position and the manually operated switch 58 released. The switch 55, as stated above, is normally closed. This switch is adapted to be opened momentarily, once during each cycle of operation of the press, by a spring pressed bell crank lever 63 (Fig. 1) under the control of a cam 64 on the cam shaft 28 of the press. This cam has a recess or depression 65 which, at the proper time, permits spring pressed bell-crank lever 63 to open switch 55. The cam 64 is designed and arranged so that the switch 55 is opened momentarily during that portion of each press operating cycle in which compressed air is applied through nozzle 31 to eject a previously extruded container into the receiving chute 30.

As described above, each extruded container that is properly ejected from the punch and die and discharged into the receiving chute actuates switch operating arm 42 and thereby closes the switch 34. The arrangement is such that during the normal operation of the press, switch 34 is closed by a properly ejected container just prior to the momentary opening of cam controlled switch 55, and the latter switch is re-closed prior to the re-opening of switch 34. Thus, during the normal operation of the press and, as long as the extruded containers are properly ejected, either one or the other of control switches 34 and 55 is closed at all times, so that as long as the main control switch 58 is held depressed, the press will operate continuously in automatically recurring cycles. However, if, for any reason, an extruded container is not properly ejected from the punch and die and discharged into the receiving chute in time to close control switch 34 at the proper time, the press is automatically stopped due to the de-energization of the clutch operating solenoid immediately upon the opening of control switch 55, which causes de-energization and, consequently, the opening of magnetic switch 59 in the energizing circuit of the clutch operating solenoid.

In connection with the following brief description of the operation of the press, it should be understood that the cam shaft 28 is driven through the usual one-revolution clutch (not shown) and that each revolution of the cam shaft operates the press through one, and only one, complete operating cycle. At the beginning of each operating cycle, the punch is in its elevated position, as shown in Figs. 2 and 3, and cam controlled switch 55 is closed, as shown in Fig. 7. Thus, assuming that the manually operated switch 58 is in its released or "up" position, as shown in Fig. 7, the operating coil of magnetic switch 59 will be energized by current supplied thereto through closed switch 55 and the upper contacts of switch 58. Magnetic switch 59 will, therefore, be closed, as shown, and it will be noted, from an inspection of Fig. 7, that the magnetic switch is adapted to be held closed by current supplied thereto through its own contacts as long as either one of the switches 34 and 55 is closed.

Assuming that cam controlled switch 55 and magnetic switch 59 are both closed, it will be apparent that upon depression of the switch 58 to bridge its lower contacts, an energizing circuit is established through the operating coil 60 of the clutch operating solenoid, whereby the clutch is operated in the usual manner, thus starting the operation of the press. The punch descends into pressing engagement with the blank 20 previously inserted into the die cavity, and a portion of the blank is thereby extruded and caused to flow upwardly along the shank of the punch to form the wall 16 of a container 17, as illustrated in Fig. 6. After the completion of the extruding operation, the punch, with the extruded container clinging thereto, is retracted from the die cavity, after which the extruded container is stripped from the punch by any suitable means, preferably by means of the mechanical stripper disclosed in my co-pending application above referred to.

After the extruding punch has moved upwardly a sufficient distance to complete the stripping of the extruded container therefrom, the container is blown into the receiving chute by a blast of air from the nozzle 31. Upon entering the mouth of the chute, the container engages the free end of arm 42, turning it counter-clockwise, as shown in broken lines in Fig. 4. Shaft 38 and switch closing cam 37 are thus rotated counter-clockwise from the positions shown in Fig. 1 toward the positions shown in Fig. 4. The extent of this angular movement of shaft 38 and cam 37 is sufficient to enable the leaf spring 45, through its cooperation with flat surfaced cam 46, to complete the counter-clockwise movement of the parts with a snap-like action. Switch 34 is thereby closed by cam 37. Shortly thereafter, cam 64 on cam shaft 28 arrives in the position in which its depressed portion 65 permits bell-crank 63 to open switch 55. This switch remains open for only a short interval of time and is then closed again just prior to the reopening of switch 34 through the restoration of switch closing cam 37 to its original position by the movement of blank feeding arm 22 in feeding another blank into the die cavity, as described above. This completes one cycle of operation of the press, and it will be understood that by holding switch 58 depressed, the press will be caused to operate continuously in automatically recurring cycles as long as the switch 34 is closed by a properly ejected container during each operating cycle.

If for any reason an extruded container is not properly ejected from the punch and die and discharged into the receiving chute, switch 34 remains open, so that upon the opening of switch 55 the energizing circuit of magnetic switch 59 is opened, whereupon the magnetic switch is opened, thus de-energizing the operating coil 60 of the clutch operating solenoid. This results in the automatic stopping of the press, thus preventing damage to the extruding punch and die, which might otherwise be caused by the "pile-up" of extruded material on the punch and in the die if the press were permitted to continue to operate after failing to properly discharge an extruded container.

In order to re-start the operation of the press after it has been automatically stopped as described above, the switch 58 is released after first removing the extruded material from the punch and die. The release of switch 58 results in the bridging of its upper contacts, thereby re-establishing the energizing circuit for magnetic switch 59, whereupon this switch is again closed. Thus, by again depressing the switch 58, the operation of the press may be resumed, and by holding this switch in the depressed position, the press will operate continuously in automatically recurring cycles, as described above, until it is again automatically stopped due to its failure to properly eject a previously extruded container.

It should be understood that the invention is not limited to the particular embodiment thereof herein illustrated and described, except insofar as is defined in the appended claims.

What is claimed is:

1. In an extruding press, an extruding die having a blank receiving cavity, means for feeding a blank into said cavity, a reciprocatory extruding punch for cooperating with the die cavity to extrude an article from a blank inserted in said die cavity, means for ejecting extruded articles from said punch and die, circuit means for initiating the operation of said extruding press including an electromagnetic clutch operating means, a manually actuated switch, a magnetic switch for maintaining said circuit to said electromagnetic means, and a control switch for controlling the energization of said magnetic switch, means operated in timed relation to said blank feeding means for actuating said control switch whereby said control switch is opened during an interval of each cycle of operation of said press, a normally open switch operable to supply current to said magnetic switch while said control switch is open, and means actuated by an ejected article for closing said normally open switch whenever an article is ejected.

2. In an extruding press, an extruding die having a blank receiving cavity, means for feeding a blank into said cavity, a reciprocatory extruding punch for cooperating with the die cavity to extrude an article from a blank inserted in said die cavity, means operable in timed relation to said punch and die for ejecting extruded articles from said punch and die, means for controlling the operation of said extruding punch including an electrically operated means, a normally open electrical switch operable upon closure to supply operating current to said electrically operated means, means actuated by ejected articles for closing said switch, means actuated by said blank feeding means for restoring said normally open switch to normal condition, a normally closed electrical switch to supply operating current to said electrically operated means, means for momentarily opening said normally closed switch at a predetermined time during each extruding cycle, a manually operable switch connected between said electrically operated means and the other two switches for completing a circuit to supply current to said electrically operated means through one or the other of the normally open or normally closed switches, and a magnetic switch operable under control of said normally closed and normally open switches for breaking the circuit to said electrically operated means when both of said switches are open.

3. In a forming press, article forming means, means for feeding blanks to said forming means, means for discharging formed articles from said forming means, operating means including a shaft for operating said forming means, a cam on said shaft for operating said blank feeding means, electrically energized means for initiating the operation of said operating means; a manually operable switch for closing a current supply circuit to said electrically energized means, a normally closed switch for supplying current to said manually operable switch, a normally open switch operable to supply current to said manually operable switch when the normally closed switch is open, means actuated by discharged articles for operating said normally open switch, and means actuated by said blank feeding means for restoring said normally open switch to normal.

4. In a forming press, article forming means, means for feeding blanks to said forming means, means for discharging articles from said forming means, means including a shaft for operating said forming means, a cam on said shaft for operating said blank feeding means, a second cam on said shaft, an electrical switch operated by said second cam, said second cam maintaining the electrical switch closed throughout a major portion of the cycle of the cam and permitting said switch to open for a small portion of the cycle of the cam, a second electrical switch normally held in an open position and positioned to be closed by discharged articles, means actuated by the blank feeding means for restoring said second switch to its normal position, a clutch operating means for causing the forming means to operate, and an electric circuit for energizing the clutch operating means including a magnetic switch having an energizing coil and contacts closed thereby and held operated by either of said electrical switches and a two position manually operable switch operable in one position to complete a circuit through either of the electrical switches and the coil of the magnetic switch to energize the magnetic switch and operable in the other position to complete a circuit through either of said electrical switches and the contacts of the energized magnetic switch to the clutch operating means.

RALPH JONGEDYK.